Oct. 20, 1942.                         M. ESSL                        2,299,421
                              LOCOMOTIVE UNDERFRAME
                               Filed May 16, 1940                9 Sheets—Sheet 1
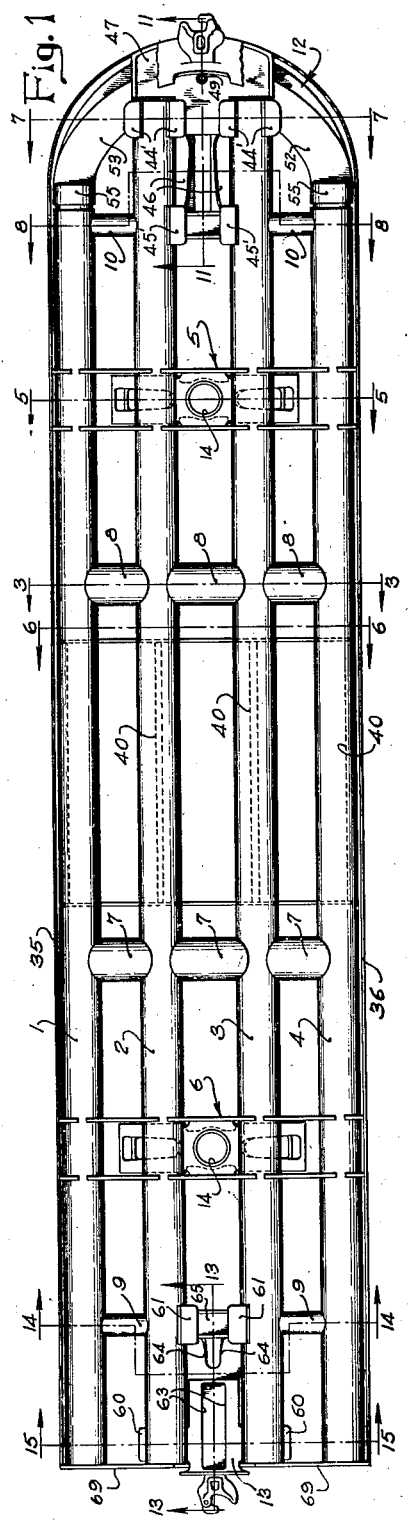
INVENTOR
Max Essl
BY
ATTORNEY Oct. 20, 1942.  M. ESSL  2,299,421
LOCOMOTIVE UNDERFRAME
Filed May 16, 1940  9 Sheets-Sheet 2
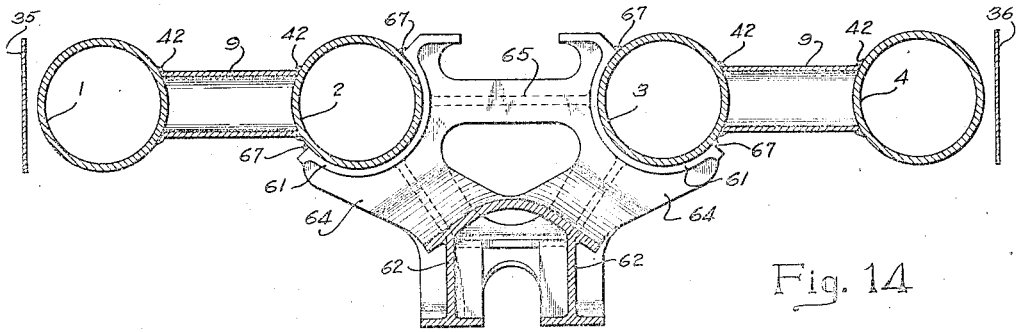
Fig. 14
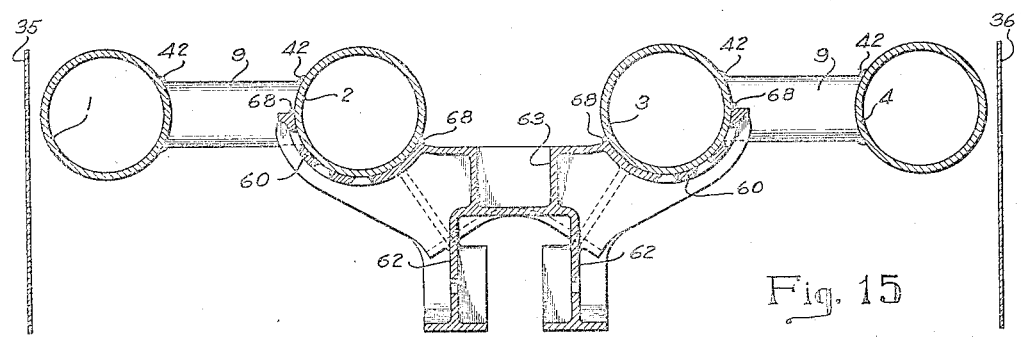
Fig. 15
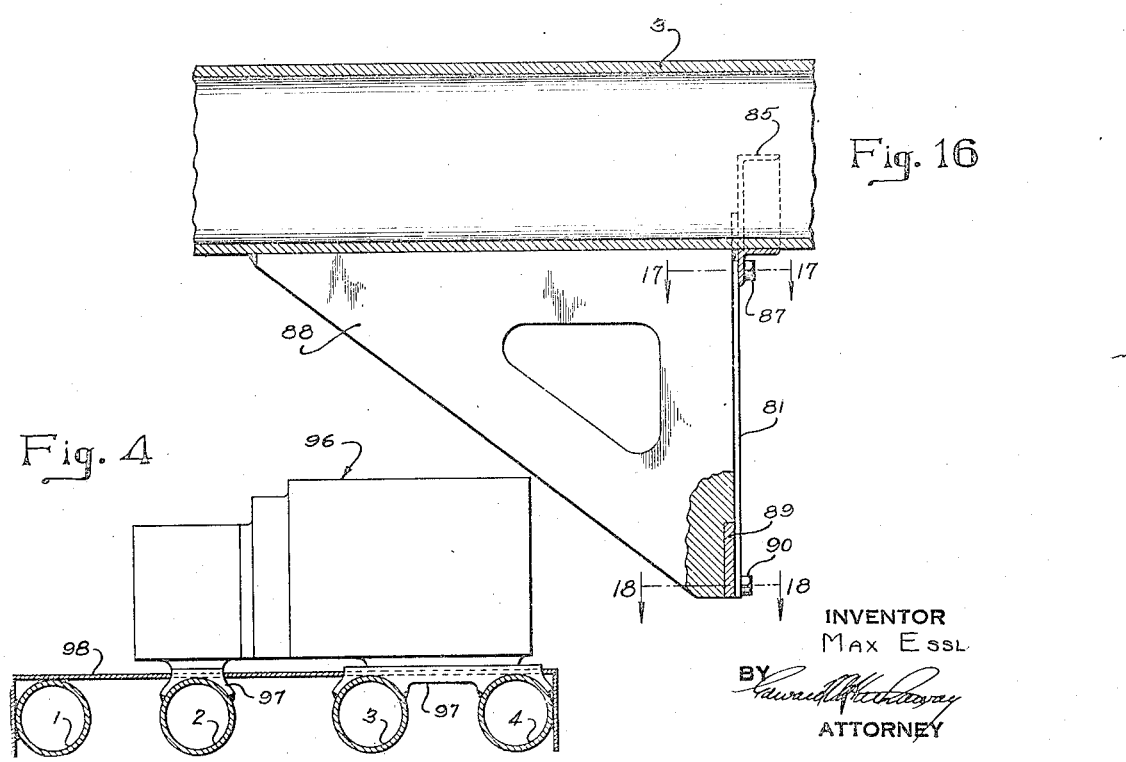
Fig. 16
Fig. 4
INVENTOR
MAX ESSL
BY
ATTORNEY

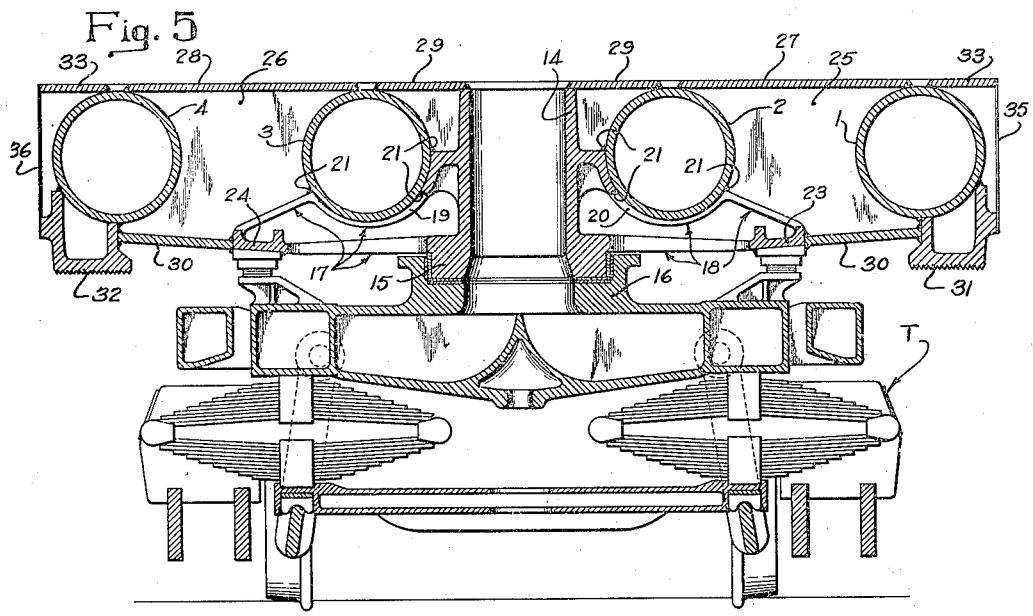

INVENTOR
Max Essl

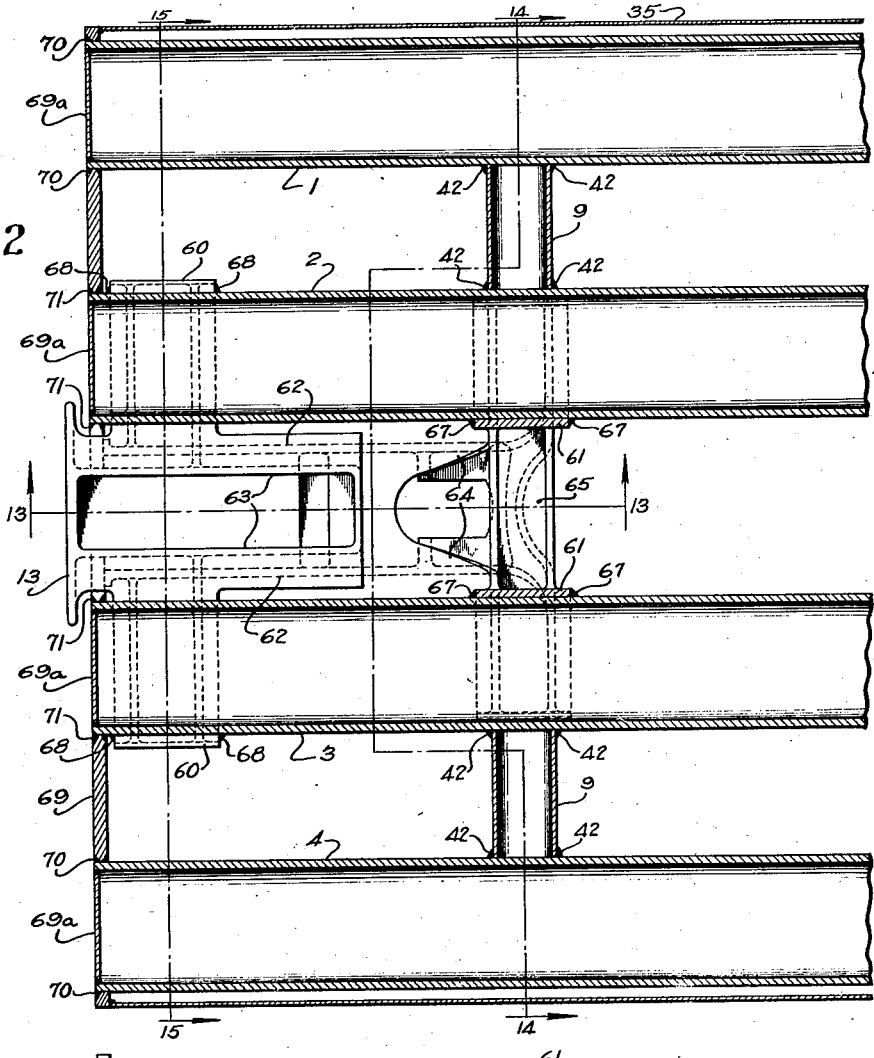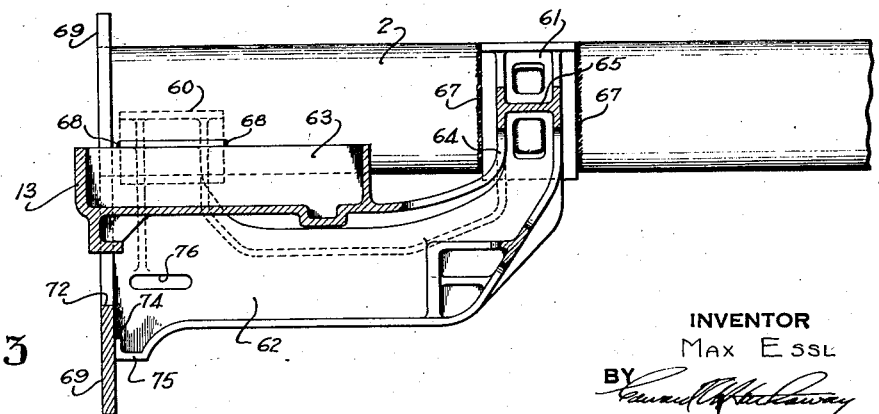

Oct. 20, 1942.  M. ESSL  2,299,421
LOCOMOTIVE UNDERFRAME
Filed May 16, 1940  9 Sheets-Sheet 7

INVENTOR
Max Essl
BY
ATTORNEY

Oct. 20, 1942.    M. ESSL    2,299,421
LOCOMOTIVE UNDERFRAME
Filed May 16, 1940    9 Sheets-Sheet 8
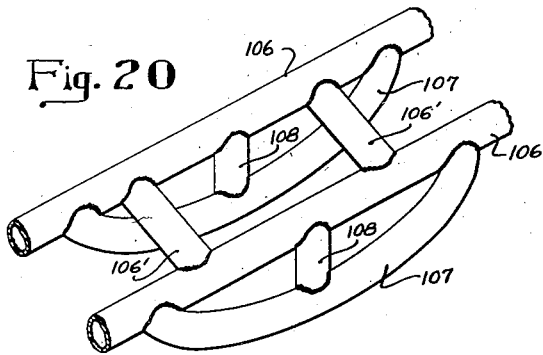
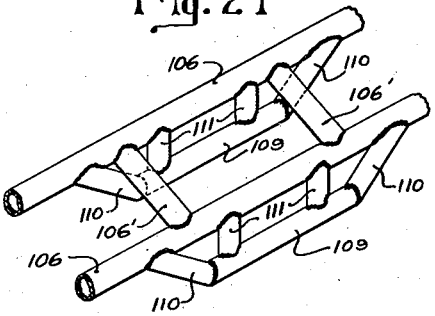
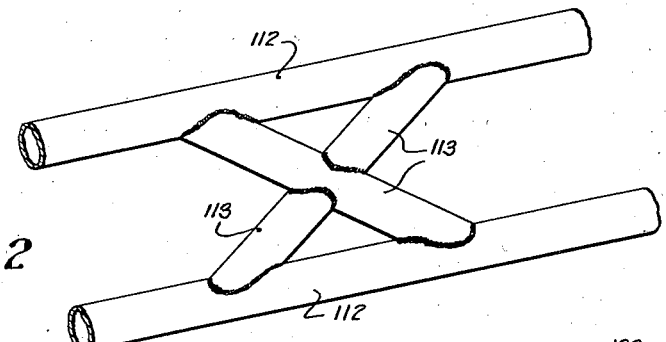
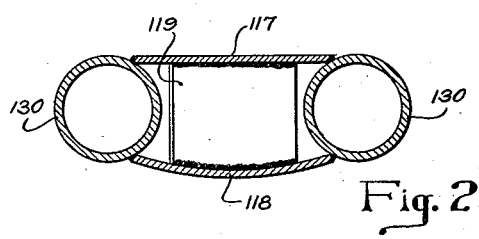
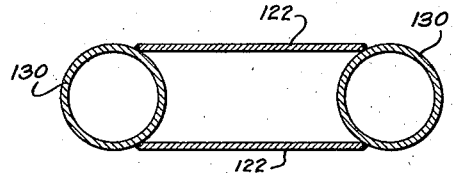
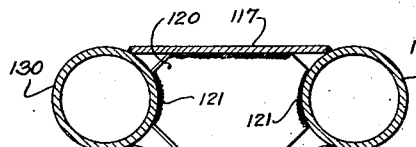
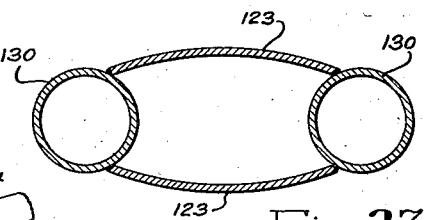
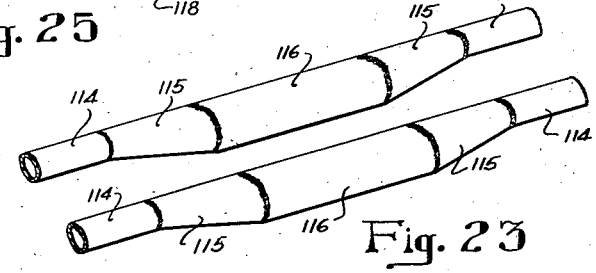
INVENTOR
Max Essl
BY
*Edward ...........*
ATTORNEY Oct. 20, 1942.    M. ESSL    2,299,421
LOCOMOTIVE UNDERFRAME
Filed May 16, 1940    9 Sheets-Sheet 9
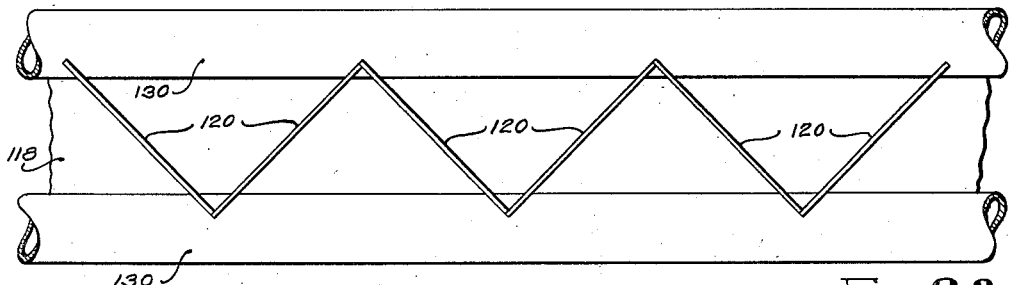
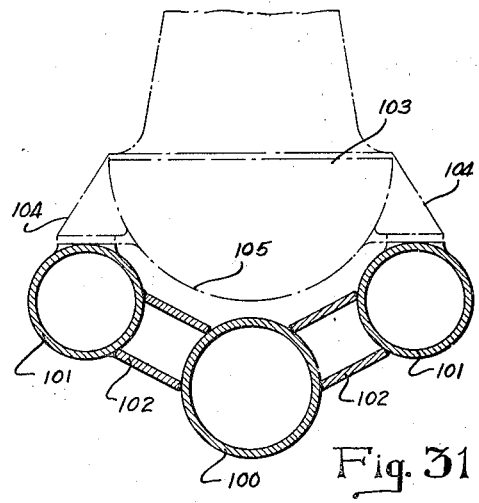
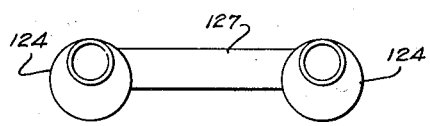
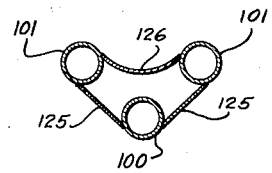
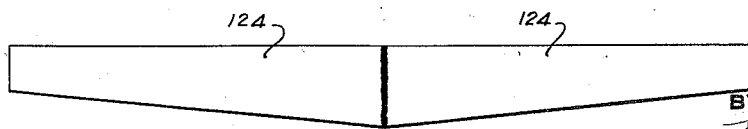
INVENTOR
Max Essl
BY
ATTORNEY Patented Oct. 20, 1942

2,299,421

UNITED STATES PATENT OFFICE 2,299,421

LOCOMOTIVE UNDERFRAME

Max Essl, Norwood, Pa., assignor to The Baldwin Locomotive Works, a corporation of Pennsylvania Application May 16, 1940, Serial No. 335,545

9 Claims. (Cl. 105—172)

This invention relates generally to underframes for locomotives, especially of the Diesel engine type.

A great many types of frames have heretofore been proposed and constructed for various types of railway equipment. Certain of these frames have had their main supporting beams formed as integral steel castings or in other instances as welded structures employing structural members such as I-beams, channels, angle irons, plates, etc. The integral cast frames have proven to be ...stly and very heavy by reason of the necessity for making thick walled sections for casting purposes, while the welded built-up frames have heretofore required excessive structural details arising from the complications incident to the use of structural I-beams, channels, etc. Serious welding problems have also been present in such prior welded structures.

It is an object of my invention to provide an improved locomotive underframe that is especially adapted for Diesel engine locomotives. It is a further object of my invention to provide an improved built-up underframe in which the main component parts are so constructed and related to each other that the welded seams may be not only very efficiently and effectively formed but also require a minimum amount of welding. Another object is to provide an improved built-up welded frame in which the component parts are so constructed and related to each other that longitudinal welded seams are reduced to a minimum thereby insuring that the load forces are transmitted largely through homogeneous structural material. A still further object is to provide a built-up welded structure that is relatively economical in construction, operation and maintenance and has a high degree of strength, rigidity, simplicity and compactness, while at the same time readily lending itself to storage of air, water and fuel oil.

In various specific aspects of my invention I accomplish the foregoing objects by providing a series of main longitudinal sills or supporting beams in the shape of tubular members formed either of drawn material or rolled plate material, hereinafter referred to as structural tubular members in distinction to cast material or to structural I-beams, channels, etc., these tubular members being cross-connected by preferably similarly formed tubular members. Cast draft and draw bar housings are preferably provided and these are welded or otherwise suitably secured to the longitudinal tubular members. Other structural features and arrangements are also embodied within my improved frame and these, as well as other objects and advantages, will be more apparent to those skilled in the art from the following description of the accompanying drawings in which:

Fig. 1 is a plan view of an underframe embodying my invention without any engine or superstructure embodied therein;

Fig. 2 is a side elevation of my improved underframe;

Fig. 3 is a transverse section taken on the line 3—3 of Fig. 1;

Fig. 4 is a diagrammatic transverse section illustrating one manner of supporting a Diesel electric power unit on an underframe embodying the principles of my invention;

Figure 7:
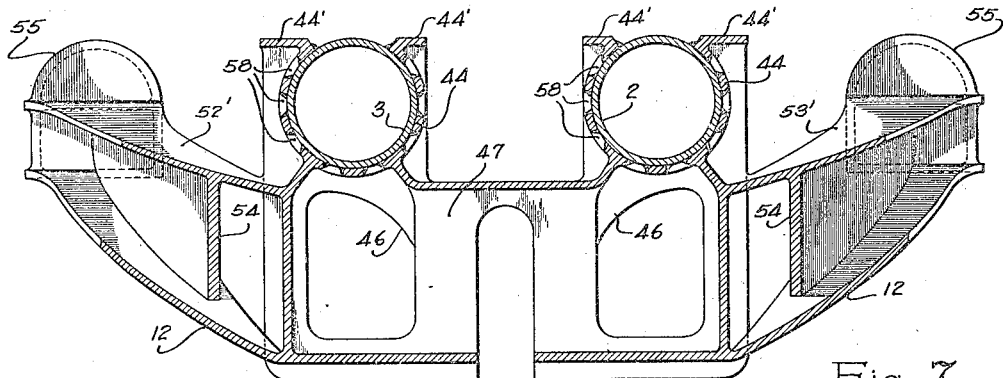
Figure 8:
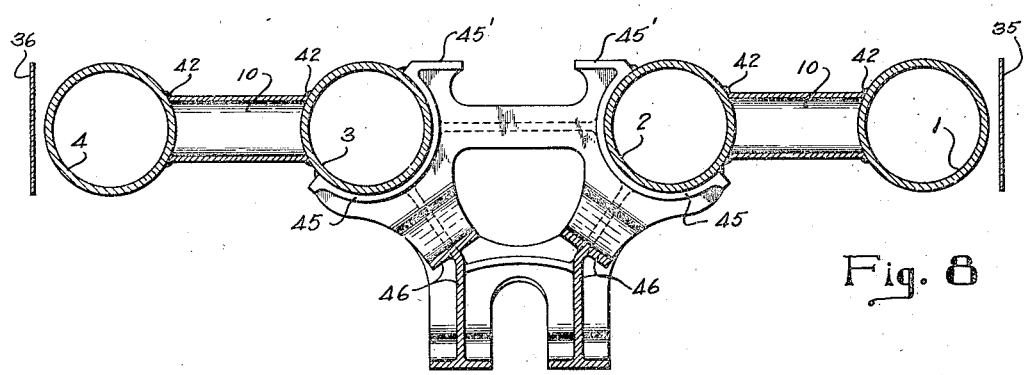
Figure 9:
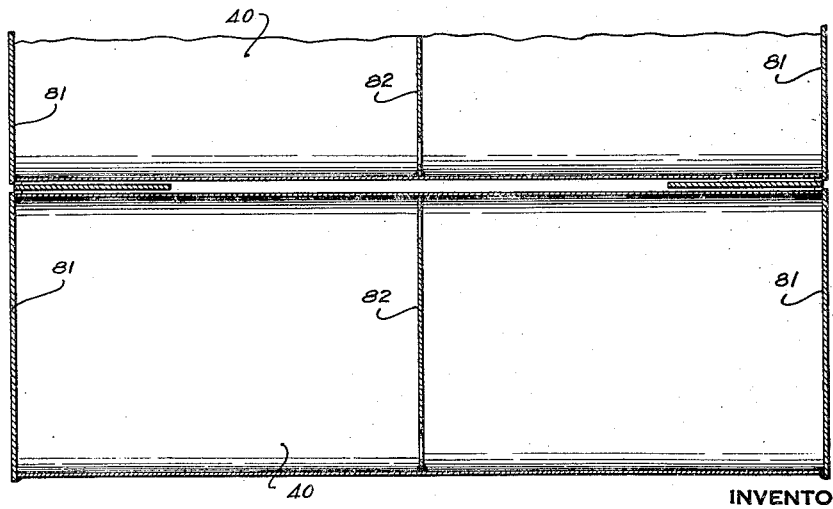
Figure 10:
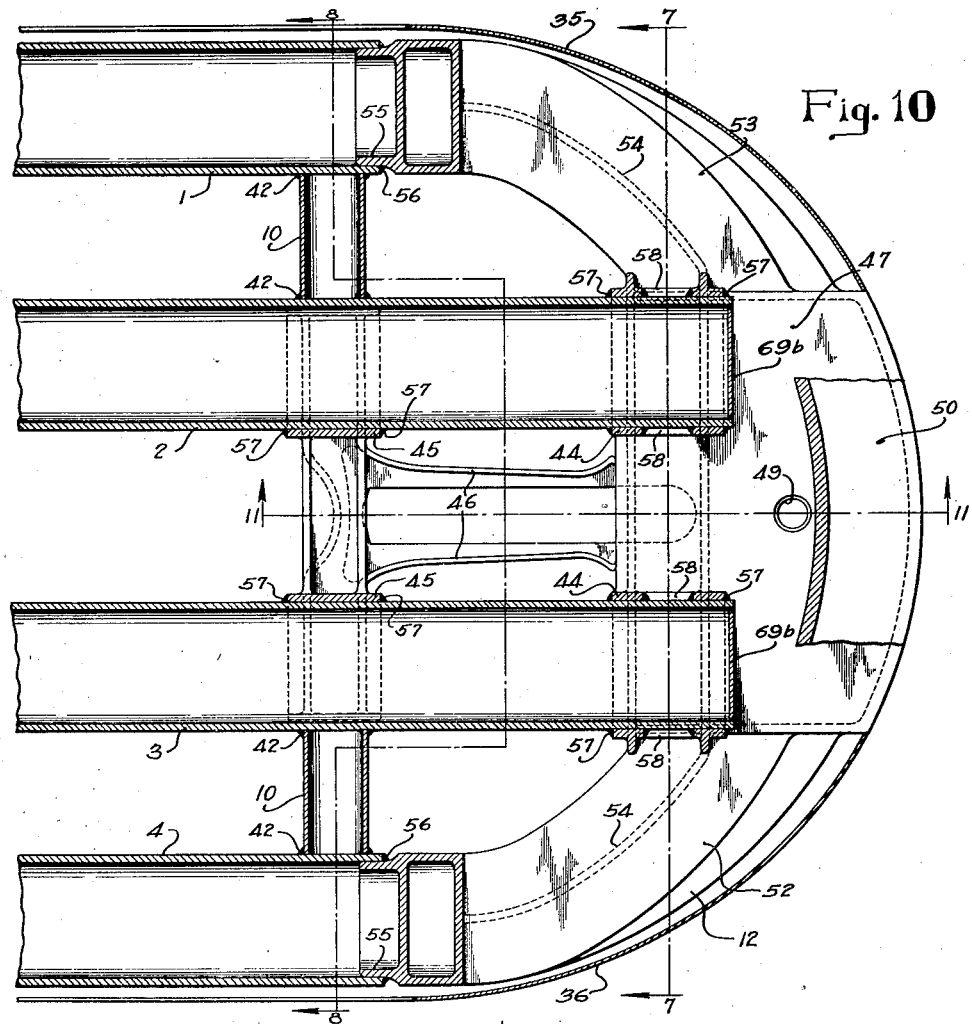
Figure 11:
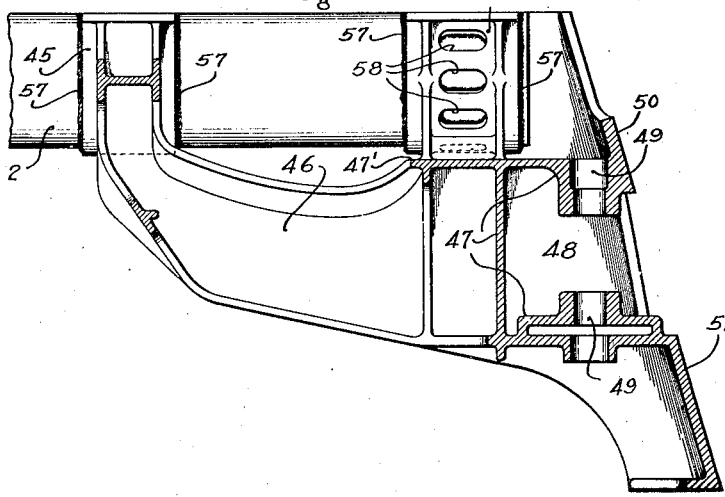
Figure 19:
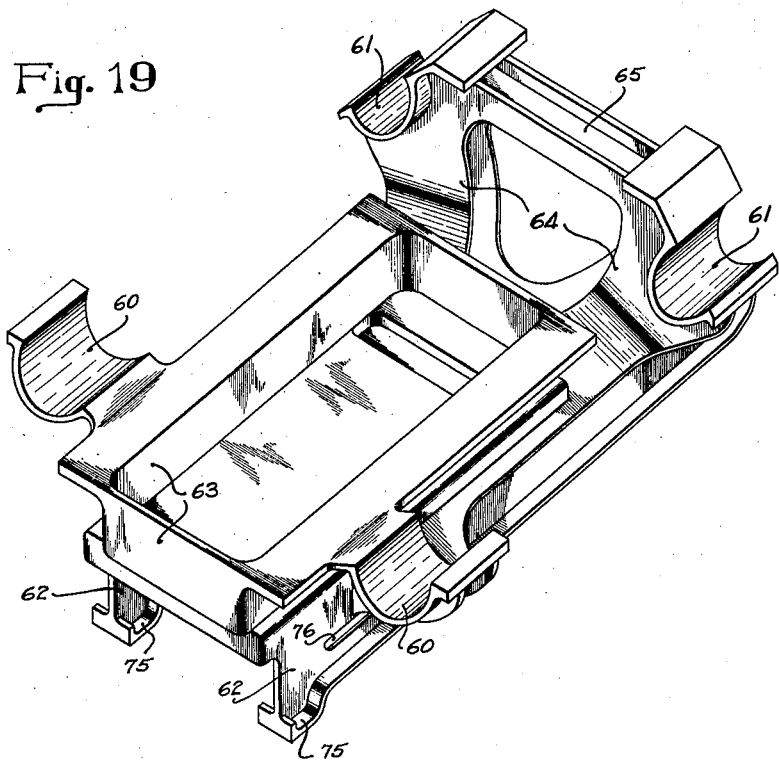
Figure 18:
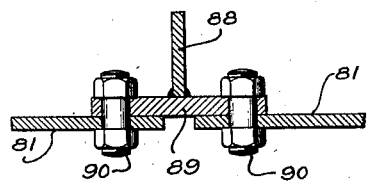
Figure 17:
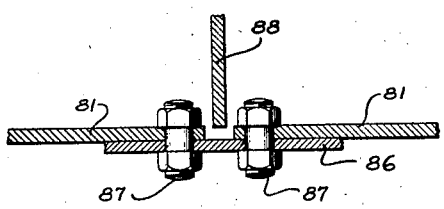

Figs. 5 and 6 are transverse sections taken respectively on lines 5—5 and 6—6 of Fig. 1;

Figs. 7 and 8 are transverse sections taken respectively on the lines 7—7 and 8—8 of Figs. 1 and 10;

Fig. 9 is a fragmentary horizontal section through the fuel tanks taken substantially on the line 9—9 of Figs. 2 and 6;

Fig. 10 is an enlarged horizontal section through the front end of the frame taken substantially on the line 10—10 of Fig. 2;

Fig. 11 is a longitudinal section taken on the line 11—11 of Figs. 1 and 10;

Fig. 12 is a horizontal section of the rear end of the frame taken substantially on the line 12—12 of Fig. 2;

Fig. 13 is a longitudinal section taken substantially on the line 13—13 of Figs. 1 and 12;

Figs. 14 and 15 are transverse sections taken substantially on the lines 14—14 and 15—15 of Figs. 1 and 12;

Fig. 16 is an enlarged longitudinal section taken substantially on the line 16—16 of Fig. 6, showing the manner of supporting the end plates for the fuel tanks;

Figs. 17 and 18 are horizontal sections taken substantially on the lines 17—17 and 18—18 of Fig. 16;

Fig. 19 is a perspective of the draft gear housing;

Figs. 20, 21, 22 and 23 are diagrammatic perspectives illustrating various arrangements of the component tubular elements that may be embodied in my frame structure;

Figs. 24, 25, 26 and 27 are transverse sections diagrammatically illustrating the manner in which adjacent longitudinal tubes may be connected by flat plates;

Fig. 28 is a plan view of a further modified arrangement for supporting adjacent tubular members;

Fig. 29 is a side elevation of a longitudinal tubular member tapered towards its end;

Fig. 30 is another modification of a three tube frame shown in transverse section and connected together by plate members;

Fig. 31 is a further modification of a three tube frame connected together by tubular members; and Fig. 32 is an end view of two adjacent tubes which may be of the form shown in either Fig. 23 or 29.

In the particular embodiments of the invention such as I have disclosed herein merely for the purpose of illustrating certain specific forms among possible others that might be employed in practice, I have omitted all detail regarding truck designs, superstructures and the multitude of accessories incident to a locomotive and have shown merely my improved tubular underframe comprising generally as shown in Fig. 1 a plurality of longitudinal tubes specifically four in number, namely, 1, 2, 3 and 4. These longitudinal tubes may be rolled plate metal of sufficiently large diameter and wall thickness to insure adequate vertical strength and the tubes, if desired, may be welded along a longitudinal seam, or, under certain conditions, the tubes may be of the drawn seamless type. These tubes are connected by front and rear bolsters generally indicated at 5 and 6, while relatively large tubular transoms 7 and 8 and relatively small tubular transoms 9 and 10 connect the longitudinal tubular members to each other, it being noted that the transom tubes 9 and 10 are in transverse alignment with certain saddles to be described presently. The two central tubular members 2 and 3 project forwardly beyond the ends of tubes 1 and 4, the front ends of the tubes then being connected by a transverse structure specifically in the form of a curved sill generally indicated at 12. The rear ends of the two central tubes are also connected by a transverse structure specifically in the form of a draft gear housing 13. The two structures are preferably secured as by welding to the two tubes 2 and 3.

The bolsters 5 and 6 are identical and as shown in Fig. 5 each comprises a casting having a center pin structure 14 terminating at its lower end in an enlarged center pin 15 which is journalled in a suitable bearing 16 of any usual or suitable type of truck diagrammatically indicated at T. Extending laterally from and formed integrally with the center pin structure 14 are saddle arms generally indicated at 17 and 18 provided with semi-cylindrical saddle recesses 19 and 20 in which are received the two inner tubes 2 and 3 suitably welded thereto by longitudinal seams indicated at 21. The outer ends of the arms 17 and 18 are provided with side bearing supports 23 and 24 to rest upon usual truck side bearings. The inner tubes and the outer tubes are connected by transverse plates 25 and 26 while upper flat plates 27 and 28 are welded directly to the tops of the inner and outer tubes as shown. Similar plates 29 connect the two inner tubes to the center pin structure 14, while a pair of lower plates 30 connect the side bearing supports 23 and 24 to jack supports 31 and 32 which, in turn, are suitably welded to the outer tubes. If desired, a set of plates 33 may be welded to the outer tubes and to vertical side aprons or plates 35 and 36 which extend longitudinally for the full length of the frame in substantially tangential but laterally spaced relation to the side tubes 1 and 4. These side aprons as shown in Fig. 2 may have their ends and intermediate portion suitably curved downwardly as at 37, 38 and 39 to suitably cover the downwardly projecting devices such as the draw bar and draft gear housings and the fuel oil tanks generally indicated at 40. These side aprons as shown in Fig. 12 have their rear ends secured as by welding to a back plate 69 to be described, and are further welded as shown in Fig. 5 to bolster plates 33 and jack supports 31 and 32 adjacent each of the bolsters 5 and 6. The side plates are further supported by vertical arms 35' and 36' welded to side tubes 1 and 4 adjacent the fuel tanks 40. The downwardly curved portions 39 of the side plates are stiffened by angle irons 39'. The aprons, as shown in Fig. 10, also curve downwardly around the front curved sill 12 and terminate preferably adjacent the side walls of the coupler housing 47 to which the side aprons are welded.

The transoms 7 to 10 are of tubular cross-section suitably cut out at their ends to receive the cylindrical surface of the longitudinal tubes, the ends of the transom tubes being welded as at 42 along the entire line of juncture between the transverse and longitudinal tubes.

The forward ends of the longitudinal tubes are rigidly connected together by a transverse structure, specifically including various component elements. One such element is a curved end sill 12 which is preferably cast as an integral unit. Other elements are a forward pair of semi-cylindrical recessed saddles 44 and a similar set of rearward saddles 45, the front and rear sets of saddles being connected together by a longitudinally extending suitably ribbed and webbed arm 46. This arm terminates at its forward end in a further element, namely, a coupler housing 47 having a coupler pocket 48. The front saddles 44 extend, Fig. 7, for a substantial distance around the two center tubes which may be axially inserted into the saddles. This provides a very strong support for the front end so as to resist eccentric loads or other undue stresses. The rear saddles 45 extend, Fig. 8, only half way around the tubes on the inner and lower sides thereof. The front saddles each terminate in a pair of bosses 44' for supporting any suitable accessory equipment or flooring while each of the rear saddles terminates in only one supporting foot 45'. The coupler housing or structure 47 is provided with suitably aligned openings 49 through which a coupler pin (not shown) extends. The structure 47 as shown in Fig. 10 extends for substantially the full width of the central tubes 2 and 3 at a point beneath the plane of the same and as shown in Fig. 11 projects from a point 47' which is adjacent the rear ends of forward saddles 44, forwardly to a surface 50, this surface in plan view, Fig. 10, providing a smooth exterior surface at the front of the locomotive. A pilot 51 is formed as part of the structure 47 and constitutes a smooth downwardly inclined continuation of the surface 50. The end sill as shown in Fig. 10 has arms 52 and 53 formed of flanged webs 54 curving rearwardly and upwardly as at 52' and 53', Fig. 7, to a point where a substantial portion of the cross-section of the side tubes is intersected by the end sill, the arms terminating in cylindrical ends 55 which are telescopically received within the tubes 1 and 4. The cylindrical ends 55 act as closure members for the outer tubes and also act as a rigid support therefor by being welded thereto as at 56. The saddles 44 and 45 are welded in a circumferential direction as at 57 to the inner tubes, it being noted that to provide maximum welded strength the forward saddles 44 may, if desired, be provided as shown in Fig. 11 with a series of openings 58 within which welded seams are formed. From the foregoing, it is seen that a very strong and effective combined end sill and draw bar housing is provided and is so arranged that it may be efficiently connected to the tubular members in a simple and durable manner, while at the same time presenting a smooth pleasing appearance of the frame structure.

The draft gear housing 13, Figs. 12, 13 and 19, is also connected to the two central frame tubes through a pair of semi-cylindrical saddles 60 and 61. The saddle 60 extends laterally from a usual or suitable type of draft housing having side walls 62 connected together by a suitable four walled structure 63 terminating at its forward end in a pair of suitably ribbed arms 64 which turn upwardly to support the saddles 61, these saddles being cross-connected by a suitably flanged member 65. The saddles 60 are inclined upwardly as they extend outwardly from the box walls 63 thereby partially extending around the outer portion of the inner tubes 2 and 3, while the saddles 61 are inclined downwardly thereby engaging the inner portions of the two central tubes 2 and 3. The pair of saddles 60 and 61 are in axial alignment and are circumferentially welded as at 67 and 68 to the central tubes thereby firmly securing the same together and to the draft gear housing for the transmission of forces through the central portion of the frame. To firmly tie in the side tubes with the inner tubes at the rear ends thereof, I provide a relatively heavy plate 69 which extends for the full width of the locomotive frame and has circular openings to receive the outer tubes 1 and 4 which are welded to the plate by circular seams 70, while suitable semi-circular recesses are provided in plate 69 to receive the inner tubes 2 and 3. These tubes are secured to the plate by welded seams 71. As shown in Fig. 13, the plate 69 is cut out at 72 to allow the plate to pass under the box structure 63 of the draft gear housing, the plate, however, bearing against the ends of side walls 62 and being welded as at 74 to suitable feet 75 projecting downwardly from the side wall 62. The ends of the side walls 62 and feet 75 broadly constitute an end supporting member for plate 69. A usual draft gear rigging, not shown herein as it does not per se constitute a part of my invention, can be inserted between the side walls 62 through the opening formed above the cut out portion 72, Fig. 13, of the back plate 69 and a usual draft gear key may then be inserted through the transverse key opening 76 formed in the side wall 62.

As shown in Fig. 12, the rear ends of the main frame tubes 1—4 are closed by circular insert plates 69a while the front ends of tubes 2 and 3 are closed, Fig. 10, by similar plates 69b. These plates are welded in position to provide a leak-proof closure. The front ends of tubes 1 and 4 are closed tightly by the cylindrical ends 55 of the end sill thereby providing four completely closed fluid storage tubes.

The four longitudinal frame tubes are throughout their length used for storage of fuel, water and air and are, therefore, leak-proof and are provided as diagrammatically shown in Fig. 3 with suitable inlet and outlet openings 80 and 80' respectively. If desired, supplemental fuel tanks 40, Figs. 2 and 6, may be used, these being shown as three in number located preferably at an intermediate point of the frame. Each of these tanks has, as shown in Fig. 9, end closure plates 81 and an intermediate baffle plate 82. The end plates as shown in Fig. 9 abut against the end edges of the cylindrical tank walls, while as shown in Fig. 6 the end plates extend upwardly as at 83 above the top of the tank 40 to provide for a bolted connection to an angle iron 85 which extends partially around the underside of the outer frame tubes 1 and 4. This angle iron between these outer tubes has semi-circular depressed portions receiving the inner tubes 2 and 3 as indicated at 86. This angle iron is suitably welded to each one of the tubes. The end plates 81 for each of the tanks 40 is suitably bolted as at 87 to the angle iron 85. It will be understood that a similar angle iron bracket is provided at each end of the tanks and that the end plates thereof are similarly bolted to the angle iron brackets. Inasmuch as the two ends are thus duplicated, further description of the other end is not deemed necessary. To longitudinally reinforce the tanks and end plates so that they will not shift relative to the frame, I have provided relatively large gusset plates 88, Fig. 16, welded to the under side of the inner frame tubes 2 and 3 while a transverse flange 89 suitably welded to the ends of the gusset plates 88 permits end plates 81 to be bolted as at 90, Fig. 6, to the flange 89. Similar gusset plates and flanges are also provided at the other end of the tank and hence need not be further described. As shown in Fig. 6, a transverse equalizing pipe 91 is connected into longitudinal channel passages 92 formed on the under side of each tank and communicating therewith through suitable openings. The end plates 81 are extended downwardly to form end closures for these channels. The equalizing pipes 91 may be disconnected by unscrewing usual pipe unions 93.

As shown in Fig. 4, my improved tubular frame allows a Diesel electric power unit diagrammatically indicated at 96 to be supported on the frame with the crankshaft axis extending transversely thereof. For instance, suitable brackets 97 having curved recesses may be supported upon only one of the tubes or upon two tubes, the two tube support being preferably employed beneath the engine, while the single support is disposed beneath the generator. The power unit may then rest upon the supports 97 and be suitably bolted or otherwise connected thereto. My frame also allows floor plates 98 to be readily supported upon the tubular members and welded thereto, if desired.

If it is desired to employ an engine whose crankshaft axis extends lengthwise of the locomotive frame, then a three tube underframe may be employed as shown in Fig. 31 wherein a relatively large central tube 100 is disposed below the level of two relatively small side tubes 101, the side tubes and central tube being connected by tubular transoms 102 in a manner already described for the preferred form. The engine 103 may then have its feet 104 suitably supported upon the outer tube frame 101, while the crankcase 105 extends downwardly between the side tubes 101 to a point near the top of the central tube 100. This arrangement insures minimum height of the engine above the frame, as well as providing an extremely rigid and non-buckling frame for supporting the engine.

Other arrangements of the frame tubes are shown in Figs. 20 and 21 wherein the longitudinal tubular members 106 are supported by curved tubular members 107 extending vertically beneath the tube 106. A tubular compression strut 108 may be inserted between the tubes 106 and 107. All of the tubular members are suitably welded to each other. In Fig. 21 a similar reinforced arrangement is employed except that a straight tube 109 is connected by any upwardly inclined tubes 110, the whole being reinforced by a pair of compression struts 111. In Fig. 22, the longitudinal frame tubes 112 are reinforced by diagonal tubular members 113 suitably welded to each other and to the longitudinal tubes 112. In Fig. 23, the longitudinal tubes are enlarged at their central portion by being formed preferably of three tubular sections 114, 115 and 116, the middle and end sections being plain cylindrical members, while the intermediate sections 115 are of conical form. The sections are suitably circumferentially welded at their points of juncture. Various arrangements may be employed for forming the air or water storage tanks between the parallel tubular frame members. For instance, in Fig. 24 an upper flat plate 117 and a lower downwardly curved plate 118 are welded to the adjacent tubes 130. In this arrangement a transverse vertical web 119 is preferably inserted between and welded to the upper and lower plates 117 and 118. In this figure, plate 119 does not engage the tubes, although in a substantially similar upper and lower plate arrangement, Fig. 25, a plate 120 may be extended to engage the tubes 130 and be welded thereto along seams 121. In Fig. 26, simple flat plates 122 are provided at the top and bottom and welded to tubes 130, while in Fig. 27 the upper and lower plates are similarly curved as indicated at 123 and welded to tubes 130. Fig. 28 is a plan view of Fig. 25 with the top plate removed therefrom. The transverse plates 120 are arranged diagonally. In Fig. 29, the longitudinal tubular beams may be formed of two frustro conical members 124 circumferentially welded at their adjacent enlarged ends. In Fig. 30, the three tube arrangement of Fig. 31 is generally employed except that the tubes 100 and 101 are connected by two flat plates 125 and one curved plate 126. When the tubular arrangement of either Fig. 23 or 29 is employed, it may be connected in the manner shown in Fig. 32, that is, by a transverse tubular member 127. Any of the tubular modifications may have cross supporting tubes as shown at 106', Figs. 20 and 21 respectively.

From the foregoing disclosure it is seen that I have provided an extremely simple and yet rugged underframe that is relatively economical in manufacture and maintenance and employs minimum welding consistent with maximum strength. The structure can be built so as to insure a high degree of uniform stress distribution. In my improved underframe the forward end sill is adapted to be functionally and structurally related to the longitudinal tubular frame beams in a manner that is highly efficient and effective so as to be conducive to maximum strength, while the draft gear housing is similarly readily adapted to be brought into functional and structural relation to the tubular members. My improved underframe also permits the bolsters and transoms to be effectively related to the tubular beams without in any way interfering with or restricting the fluid storage capacity or characteristics of the four longitudinally parallel tubular beams 1 to 4.

It will of course be understood that various changes in details of construction and arrangement of parts may be made by those skilled in the art without departing from the spirit of the invention as set forth in the appended claims.

I claim:

1. A locomotive underframe comprising, in combination, a plurality of longitudinal tubular members the outer dimensions of which define substantially the full depth of the frame, and a transverse structure disposed beneath the bottom of said frame and having saddles with upwardly open curved recesses at the top of said structure conforming to the outer contour of the lower side of said tubular members to receive the same, said saddles being arranged in forward and rearward pairs, the forward pair extending around the tubular members for the major portion of their circumference while the rear pair of saddles extends around the tubular members at the inner and lower portions thereof for a distance of substantially only one-half of the circumference of the tubular members.

2. A locomotive underframe comprising, in combination, a plurality of longitudinal tubular members the outer diameter of which defines substantially the full depth of the frame, a transverse structure disposed beneath the bottom of said frame and having upwardly extending saddles terminating in upwardly open recesses for receiving the lower portion of said tubular members to connect the same together, said structure having a horizontal wall extending rearwardly beneath the plane of said tubular members and disposed vertically downwardly therefrom to form a draw bar pocket, and a saddle at the rear end of said horizontal wall for connection to said tubular members.

3. A locomotive underframe comprising, in combination, longitudinally extending inner and outer tubular members the outer diameter of which defines the full depth of the frame, and an end sill having an end closure connection with the outer tubular members and an upwardly extending saddle for receiving the under side of the inner ones of said tubular members.

4. A locomotive underframe comprising, in combination, a pair of outer longitudinal tubular members and a pair of inner longitudinal tubular members projecting beyond the ends of said outer tubular members, and an end sill structure having transversely spaced saddles with recesses therein to receive the inner tubular members, the end sill curving rearwardly from said saddles and having a telescopic closure connection with the side tubular members.

5. The combination set forth in claim 4 further characterized in that the portion of the end sill which is adjacent to the saddles is located in a plane below the same, said end sill rising as it extends rearwardly so that a substantial portion of the cross-sectional area of the side tubular members is intersected by the end sill.

6. A locomotive underframe comprising, in combination, a pair of longitudinal side tubes and a pair of longitudinal central tubes, a transverse structure having forward and rearward pairs of saddles in which the central tubes are disposed, and tubular transoms connecting each inner tube with the side tube adjacent thereto, said tubular transoms being substantially in transverse alignment with the rear pair of saddles.

7. A locomotive underframe comprising, in combination, a plurality of longitudinal tubular members, a draft gear housing having saddles in which said tubular members are supported and welded thereto, and a transverse plate welded to said tubular members and provided with a recessed portion adjacent to said draft gear housing to provide longitudinal access thereto.

8. A locomotive underframe comprising, in combination, a plurality of longitudinal tubular members, a draft gear housing having saddles in which said tubular members are received and welded thereto, a vertical supporting member formed at the end of said housing adjacent to the ends of said tubular members, and a transverse plate welded to said tubular members and abutting against said vertical supporting member.

9. A locomotive underframe comprising, in combination, a plurality of longitudinal tubular members, circumferentially extending longitudinally spaced flanges secured to at least certain of said tubular members on the lower portion thereof, transversely extending vertical plates secured to said flanges, and a tank having its ends secured to and closed by said plates whereby said plates constitute both supporting and tank forming members.

MAX ESSL.

CERTIFICATE OF CORRECTION.

Patent No. 2,299,421.  October 20, 1942.

MAX ESSL.

It is hereby certified that error appears in the printed specification of the above numbered patent requiring correction as follows: Page 4, second column, line 28, claim 2, strike out "combination, a plurality of longitudinal tubular" and insert the same before "members" in line 27, same claim; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.